United States Patent [19]

Plummer

[11] 4,287,989
[45] Sep. 8, 1981

[54] STORAGE CONTAINER FOR MAGNETIC TAPE CASSETTES

[76] Inventor: Edward B. Plummer, 29472 Thackery Dr., Laguna Niguel, Calif. 92677

[21] Appl. No.: 103,865

[22] Filed: Dec. 14, 1979

[51] Int. Cl.³ .............................................. B65D 85/67
[52] U.S. Cl. .................................................... 206/387
[58] Field of Search ............... 206/387, 461, 472, 493; 229/19

[56] References Cited

U.S. PATENT DOCUMENTS

| | | | |
|---|---|---|---|
| 2,616,666 | 12/1952 | Nadel | 206/461 |
| 2,690,199 | 9/1954 | Bennorth | 229/19 |
| 3,746,180 | 7/1973 | Spiroch et al. | 206/387 |
| 3,829,132 | 8/1974 | Willieme | 206/387 |

Primary Examiner—William T. Dixson, Jr.

Attorney, Agent, or Firm—K. H. Boswell; Edward D. O'Brian

[57] ABSTRACT

A storage container for one or more magnetic tape cassettes includes a support base and a cassette holding sleeve mounted on the base. The holding sleeve includes two upstanding walls each of which is independently attached to the support base such that it is essentially perpendicular to the support base. The walls are parallel to each other and spaced from one another such that the cassette can fit between them. A top wall is integrally formed with the upstanding walls such that it is essentially coplanar with the support surface. Together the top wall and the upstanding walls form the sleeve. Located on the top wall and projecting toward the support surface are one or more protuberance members which are capable of partially fitting within the capstan locating holes of the cassette to fixedly hold the cassette within the sleeve.

10 Claims, 7 Drawing Figures

U.S. Patent  Sep. 8, 1981  Sheet 1 of 3  4,287,989
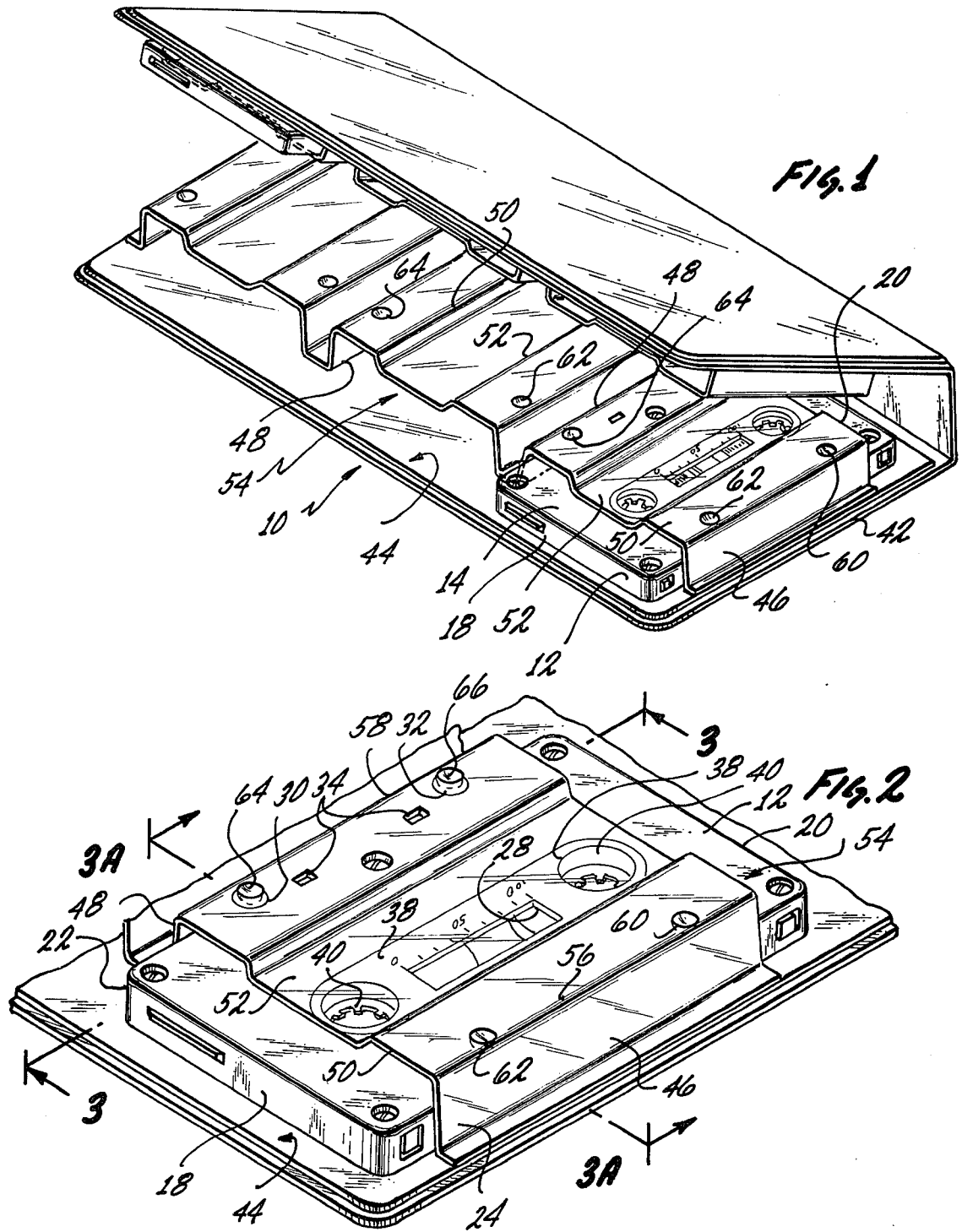

STORAGE CONTAINER FOR MAGNETIC TAPE CASSETTES

BACKGROUND OF THE INVENTION

This invention pertains to a storage container for magnetic tape cassettes of the type used in home and auto stereos. The storage container contains one or more protuberances which are capable of being located in association with the capstan locating holes of the cassette to fixedly maintain the cassette within the storage container.

Magnetic tape cassettes have recently become the standard of the magnetic tape recording industry for use in home and automobile stereo systems, replacing 8-track systems and, except in the most expensive units, reel-to-reel. The common cassette has a parallel top and bottom surface with two openings which are slightly to one side of the longitudinal axis of a cassette. Within these two openings are two spoked hubs which are used to drive the tape within the cassette. Two sets of mutually perpendicular side surfaces are placed in between the top and bottom surface and together the side surfaces and the top and bottom surface form a sort of box-like container for the tape inside. One of the side surfaces has a plurality of openings in it through which the tape is exposed for transmittal of its information to the heads of the tape recorder. Adjacent to these openings and extending between the top and bottom surfaces are two capstan locating holes. Only one of these holes is utilized at a time by the recorder. However, when the tape is flipped from side A to side B the opposite capstan locating hole is utilized by the recorder. The cassette is labeled by placing either a paper or metallic label on both the top and bottom surfaces with appropriate openings in the label to allow for exposure of the spoked hubs. These labels are permanently glued to the top and bottom surfaces and thus are not replaceable if damaged or destroyed.

The cassettes can be purchased with prerecorded information on them or the user can record his own information thereon. When purchased these cassettes, at least the better quality ones, are shipped in a small plastic container. This container provides excellent protection of the cassette. However, when the cassettes are used in mobile applications such as automobiles, boats, etc., these containers are found to be bulky, take up considerable amount of space, and are subject to being jarred open. Further, when stored in a situation such as in the glove compartment of an automobile there is no way to maintain them in an organized manner so that the user may extract a particular cassette while still maintaining concentration on his driving.

Another area in which cassettes are finding widespread use is in the field of prerecorded information such as language courses, bible studies and the like. Normally these courses or studies include a plurality of tapes the exact number depending on the amount of information which is being conveyed. When a plurality of these tapes having a unified subject matter are sold they are usually packaged in a single container. One of the most popular forms of these containers is a book-like container having a protective, hard outer casing and flexible page-like members which have attached to them a plurality of individual cassette holders.

One of the book-like containers mentioned above utilized a locking system which prevents the tapes from accidentally being spilled out of the individual cassette holders. This locking system is based on having a projection which is capable of fitting into the openings where the spoked hubs are located. Unfortunately in order to place the projection within the opening of the spoked hub it is necessary to first slide this projection across the surface of the label of the cassette. It doesn't take too many insertions and withdrawals of a cassette into and out of the holder before the projection starts to destroy the surface of the label. Once this process is started it seems to apparently escalate with each additional insertion and withdrawal until the indicia on the label are either obliterated or the label is torn from the cassette. Further, since this projection is located to fit within the opening of the spoked hub it has to be located in the center of the individual cassette holder despite the fact that the spoked hubs aren't directly in the center of the cassette to allow the cassette to be inserted without regard to its top and bottom surface. This locates the projection on one side or the other of the opening. Because the projection must be capable of being distorted to allow it to slide over either the top or bottom surface of the cassette before being placed in the opening of the spoked hubs, the surface to which the projection is attached has to be flexible. However, since this surface is flexible, once the projection is located over the opening of the spoked hubs the projection must be of sufficient proportions to fit deeply enough against one side or the other of the opening of the spoked hub without allowing the cassette to slip from the holder. The necessity to proportion this projection large enough to allow it to do this further causes this same projection to dig even deeper into the label on the cassette when the cassette is being slid in and out of the holder.

SUMMARY OF THE INVENTION

In view of the above discussion it is evident that there is a need for new and improved storage containers for magnetic tape cassettes. It is a broad object of this invention to fulfill this need. It is a further object of this invention to provide a container which not only fills the first object but additionally is uncomplicated and inexpensive to manufacture and thus inexpensive to the consumer yet is reliable and capable of a long service life.

These and other objects as will become evident from a remainder of this specification are fulfilled by providing a storage container for magnetic tape cassettes of the type having an enclosed case with essentially parallel top and bottom surfaces and two sets of essentially parallel side surfaces, each set essentially mutually perpendicular to the other set, one of said side surfaces of one of said sets including an opening exposing the surface of the magnetic tape and two capstan locating holes passing through said cassette from said top surface to said bottom surface proximal to said side surface wherein said opening is located which comprises: a support base and at least one cassette holding sleeve fixedly attaching to the support base such that the support base forms the lower surface of the holding sleeve. The holding sleeve includes two upstanding walls each independently attached to the support base in a manner such that they are essentially perpendicular to the support base and also parallel to each other and are spaced from one another at a distance slightly greater than the distance between the side surfaces of one of the sets and the side surfaces of the cassette. A top wall is attached to each of the upstanding walls and is spaced from the support base at a distance which is slightly greater than the thickness of the cassette at the widest point between the top and bottom surfaces of the cassette. Together the upstanding walls, the top wall and the support base form a sleeve which is capable of containing at least that portion of the cassette wherein the capstan locating holes are located. Projecting down from the top wall toward the support base is at least one protuberance means. The protuberance means is capable of fitting in one of the capstan locating holes when the cassette is located in the sleeve in such a manner that the protuberance means is concurrently in position over the capstan locating holes and one set of the side surfaces of the cassette are adjacent to the upstanding walls. That top wall which contains the protuberance means is capable of being distorted away from the support base to allow the protuberance means to be distorted away from the support base such that the capstan locating holes can be positioned below this protuberance means.

In a preferred embodiment of the invention the protuberance means comprises a hemispherical shaped boss. Four of these are utilized in sets of two. Each member of the set is located with respect to the other member of it set at a distance equal to the distance between the two capstan locating holes. Each set is located adjacent to the edge wherein the top wall is connected to the upstanding walls.

BRIEF DESCRIPTION OF THE DRAWINGS

This invention will be better understood when taken in conjunction with the drawings wherein:

FIG. 1 is an isometric view of the preferred embodiment of the invention;

FIG. 2 is an isometric view showing in greater detail the lower right hand section of FIG. 1;

Figure 3:
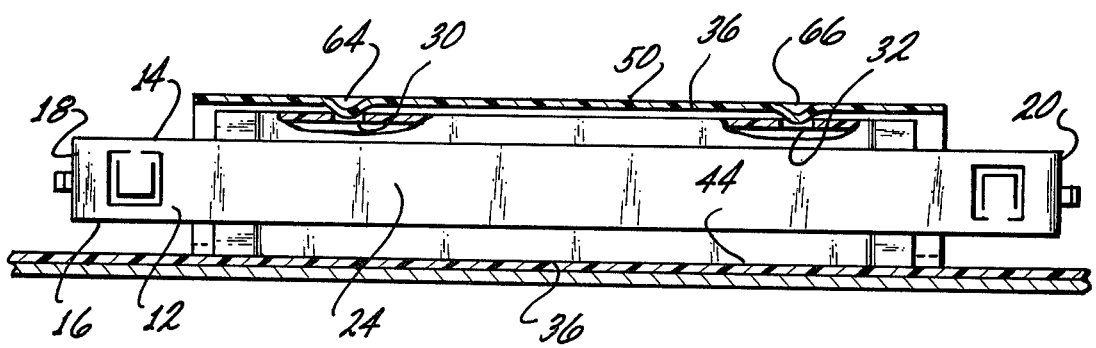
FIG. 3 is a side elevational view in section taken at the line 3—3 of FIG. 2.

The invention described in this specification and shown in the drawings utilizes certain principles and concepts which are set forth in the claims appended to this specification. Those skilled in the art to which this invention pertains will realize that these principles and concepts could be applied to a number of differently appearing embodiments differing from the exact embodiments described in this specification and shown in the drawings. For this reason this invention is not to be construed as being limited to the exact embodiments depicted herein but is to be construed solely in light of the claims.

DETAILED DESCRIPTION

The cassette storage container 10 of this invention utilizes certain structural members which can be arranged in alternate ways depicted in the alternate embodiments of this invention. For the purposes of this description those structural members of the storage container 10 which are the same as or equivalent to other structural members depicted in alternate embodiments will be identified with the same numeral in each of the different embodiments described.

While not forming a part of this invention in order to fully understand how this invention works a standard cassette 12 needs to be described. The cassette 12 has a bottom and top surface 14 and 16, respectively, which are spaced from one another by two sets of parallel surfaces. The first set of surfaces are end surfaces 18 and 20 and the second set of surfaces are side surfaces 22 and 24. Certain structural features seen in the drawings are located on these surfaces which have no function in this invention and therefore are not identified. Incorporated into side surface 22 are a plurality of openings collectively identified by the numeral 26 through which the magnetic tape 28 is exposed. Located adjacent to surface 22 are two capstan locating holes 30 and 32, respectively, which are utilized in the operation of the cassette 12 inside a recording machine. Additionally located next to the capstan locating holes 30 and 32 are two other locating holes collectively identified by the numeral 34 which are also utilized in the function of the cassette 12 in a recording machine. A raised surface 36 is located both on the top and bottom surfaces 14 and 16. It is within this raised surface 36 that the holes 30 to 34 are actually located. As with other components the raised surface 36 is utilized in the interaction of the cassette 12 with a recording machine. Located near the center of the cassette 12 are two openings collectively identified by the numeral 38 in which are located two spoked hubs collectively identified by the numeral 40. The magnetic tape 28 is wound around the spoked hubs 28 in the recording machine. The openings 38 are used by the tape driving mechanism of a recording machine.

In the embodiment of the storage container 10 shown in FIGS. 1 through 3A a book-like housing 42 is hinged to fold over on itself. Attached to the housing 42 is a support base 44. Rising essentially perpendicular from the support base 44 are upstanding walls 46 and 48. The upstanding walls 46 and 48 are essentially parallel to one another and are spaced apart from one another in this embodiment by a distance which is slightly greater than the dimension of the cassette 12 measured between the two side walls 22 and 24. Integrally formed with the upstanding walls 46 and 48 is a top wall 50. The top wall 50 contains a depressed section 52. Together the support base 44, the upstanding walls 46 and 48 and the top wall 50 form a sleeve-like structure 54 capable of accepting the cassette 12 within its interior.

The depressed section 52 in top wall 50 allows the cassette 12 to be inserted within the sleeve 54 without having to take notice of which side the raised surface 36 is positioned at, i.e., whether or not raised surface 36 is located adjacent to upstanding wall 46 or upstanding wall 48. As will be noted later when describing an alternate embodiment of this invention, it is not mandatory to include depressed sections 52 in top wall 50.

Top wall 50 and upstanding walls 46 and 48 are integrally formed of a flexible plastic material which can be either solvent welded or heat sealed to the support base 44 which is preferably constructed of a more rigid material. The sleeve 54 is open at both ends allowing inserting and withdrawal of the cassette 12 from either direction.

Figure 3A:
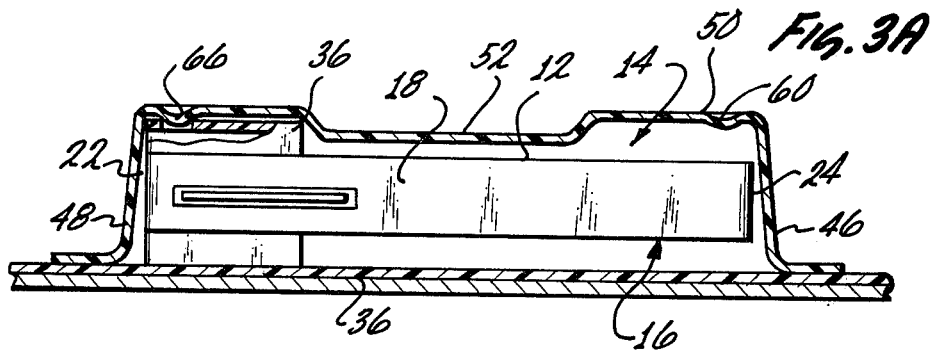
FIG. 3A is an end elevational view in section taken at the line 3A—3A of FIG. 2.

Located adjacent to the edges 56 and 58 wherein top wall 50 is connected to upstanding walls 46 and 48, respectively, are four hemispherically shaped bosses 60 through 66 which project or protrude downwardly toward support base 44. Boss 60 is spaced from boss 62 and boss 64 is spaced from boss 66 by a distance which is equal to the distance between capstan locating holes 30 and 32. Each of the bosses 60 through 66 is spaced from upstanding walls 46 and 48 by a distance which is slightly greater than the distance of the capstan locating holes 30 and 32 from side surface 22. When the cassette 12 is located within the sleeve 54 this allows either boss 60 and 62 or alternately boss 64 or 66 to be located directly over capstan locating holes 30 and 32 and to partially descend into these capstan locating holes. The interaction of the bosses 60 through 66 with the capstan locating holes 30 and 32 is depicted in FIGS. 3 and 3A.

When the cassette 12 is slid into the sleeve 54 the bosses 60 through 66 ride across the top of raised surface 36 which causes the top wall 50 to be distorted compared to the support base 44. Since the bosses 60 through 66 are located very close to the upstanding walls 46 and 48 not all of the distortion will be simply an upwardly flexing of the top wall 50, but also some of the force is transmitted to one or the other of the side walls 46 or 48. Depending on how the cassette 12 is oriented in the sleeve 54 one or the other of the upstanding walls 46 or 48 will be stretched away from support base 44 and/or caused to deflect slightly outwardly. The restoring force against this distortion is therefore not exclusively supplied by the top wall 50 but in fact is a combination of both the top wall 50 and the side walls 22 or 24. Because of this the bosses 60 through 66 can exert considerable pressure against the cassette 12 without projecting very far from the surface of top wall 50 toward the support base 44. In the prior art device wherein the projection is located in the center of the holder and fits within the opening 38 all or at least the largest percentage of the force retaining the cassette within the holder is supplied by the top wall and the projection is deflected only upwardly from the bottom of the holder as opposed to the instant device wherein the bosses 60 through 66 can be deflected not only upwardly but also outwardly. In removing the cassette 12 from the sleeve 54 once the bosses 60 through 66 have been lifted free from the capstan locating holes 30 and 32 the bosses easily slide along the smooth hard surface of the raised surface 36.

As is evident from inspection of FIGS. 1 through 3A the cassette 12 can be inserted or removed from either end of the sleeve 54 and the pressure necessary to initially lift the bosses 60 through 66 from the capstan locating holes 30 and 32 for removal of the cassette 12 from the sleeve 54 is easily applied by pressing against the cassette 12 at the end opposite from the end of the sleeve 54 through which the cassette 12 will exit, i.e., for example, in FIG. 1 if the cassette 12 is to be removed from the sleeve 54 at the end closest to FIG. 2 finger pressure against the end of the cassette 12 located near the fold of the book housing 47 will easily dislodge the cassette 12 from the sleeve 54.

Figure 4:
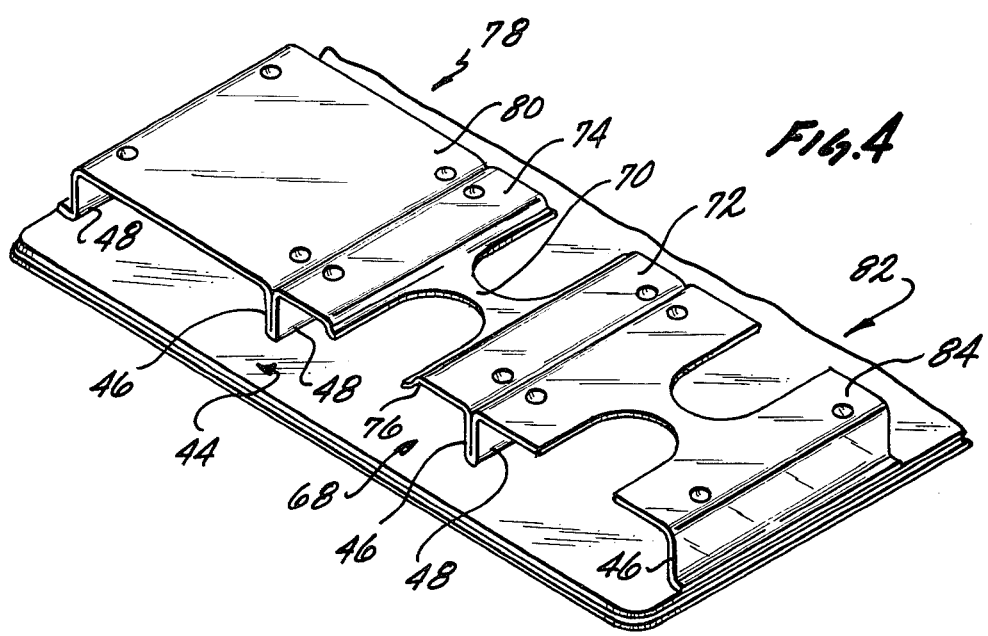
FIG. 4 is an isometric view showing alternate embodiments of the invention.

In FIG. 4 there is shown several alternate embodiments of the storage container 10. Firstly the upstanding walls 46 and 48 are located in almost continuous relationship. This allows for the placement of a multiple of sleeves in a smaller area. The center sleeve 68 differs from the sleeve 54 in that the depressed section 70 is almost totally cut away forming slots for the fingers of a person to fit into when the cassette 12 is slid from the sleeve 68. Since contrary to the known cassette holders there is no necessity of having a top wall located over the area of the opening 38 the depressed section 70 can in fact be formed such that only a very thin section of material connects the remaining portions 72 and 74 of the top wall 76.

The sleeve 78 at the left hand side of FIG. 4 differs from the other sleeve in that the depressed section has totally been eliminated. The top wall 80 of this sleeve forms a smooth continuous surface. The sleeve 82 on the right hand side incorporates the features shown for the center sleeve 68 and the left hand sleeve 78 in that it has both a flat top wall 84 which is cut out in a manner similar to center sleeve 68.

Figure 5:
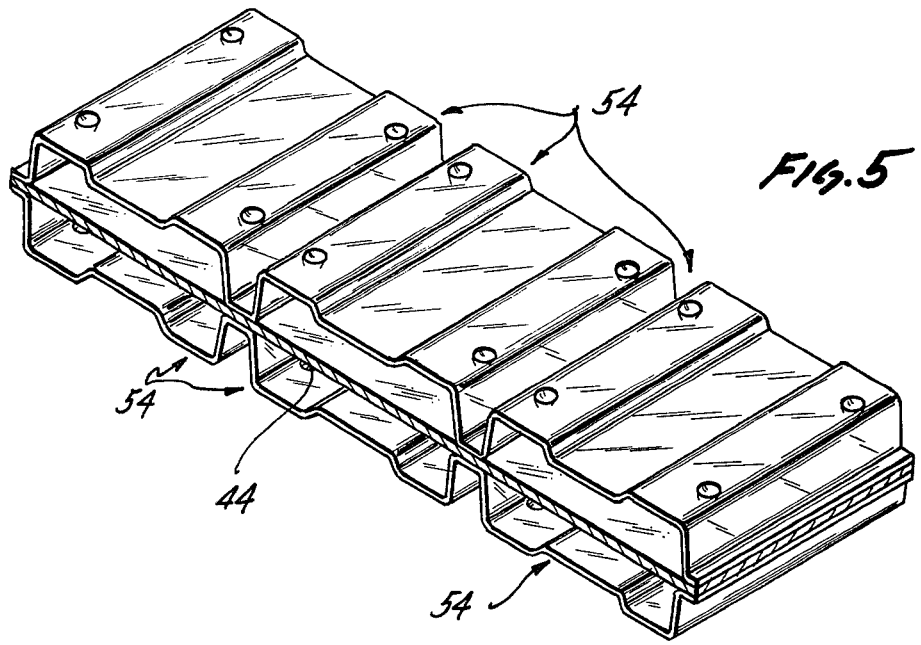
FIG. 5 is an isometric view showing alternate embodiments of the invention.

The embodiment shown in FIG. 5 shows an alternate arrangement of the sleeves 54 wherein a single support base 44 serves as the support surface for two sleeves 54.

Figure 6:
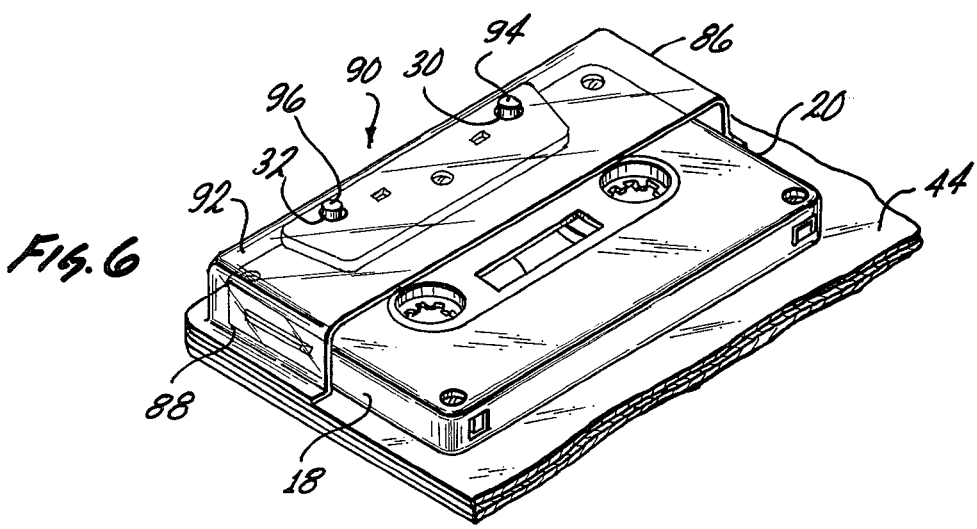
FIG. 6 is an isometric view showing alternate embodiments of the invention.

In FIG. 6 another alternate embodiment of the invention is shown wherein side walls 86 and 88 only extend a portion of the distance along end surfaces 18 and 20 of the cassette 12 and they are connected by a third upstanding wall 90. The top wall 92 is integrally formed with all three of the walls 86, 88 and 90 and contain appropriate bosses 94 and 96 which fit into capstan locating holes 30 and 32 in a manner as previously described for the other embodiments. Since the cassette 12 is maintained within the sleeve 98 defined by the side walls 86, 88 and 90 by the interaction of the bosses 94 and 96 with the cassette 12 there is no need for the top wall 92 nor the side walls 86 and 88 to be any larger than that as shown. However, they could be sized to enclose a greater portion of the cassette 12. A container for an individual cassette could incorporate the embodiment shown in FIG. 6 by so increasing the size of the top wall 92 and the side walls 86 and 88. This container would be a useful alternative to the hard plastic shipping containers now used for better quality cassettes.

These sleeves 54, 68, 78, 82 and 98 are conveniently formed of flexible plastic material which is useable in state of the art vacuum forming methods. Alternately to vacuum forming, injection molding could be used. The support base 44 is preferably of a plastic material which is slightly more rigid than the material used for the sleeves and will maintain its shape unless put under excessive stress. The sleeves are suitably thermally or solvent welded to the support surface.

I claim:

1. A storage container for magnetic tape cassettes of the type having an enclosed case with essentially parallel top and bottom surfaces and two sets of essentially parallel side surfaces each set essentially mutually perpendicular to the other set, one of said side surfaces of one of said sets including an opening exposing the surface of the magnetic tape and two capstan locating holes passing through said cassette from said top surface to said bottom surface proximal to said side surface wherein said opening is located which comprises:

a support base;

at least one cassette holding sleeve fixedly mounted to said support base;

said cassette holding sleeve including two upstanding walls, each independently fixedly attached to said support base essentially perpendicular to said support base and spaced essentially parallel to one another at a distance slightly greater than the distance between the side surfaces of one of said sets of said side surfaces of said cassette, a top wall located with respect to said support base at a distance slightly greater than the thickness of said cassette between said top and said bottom surfaces of said cassette, said top wall attaching to each of said upstanding walls so together said support base, said upstanding walls, and said top wall form said holding sleeve, said holding sleeve capable of containing between said top wall and said support base at least that portion of said cassette which includes the capstan locating holes;

at least one protuberance means integrally formed with said top wall and projecting toward said support surface, said protuberance means positioned on said top wall to be located directly over one of said capstan locating holes when said cassette is located in said sleeve such that one of said sets of said side surfaces of said cassette are adjacent to said upstanding walls;

at least that portion of said top wall wherein said protuberance means are located capable of being distorted in a direction away from said support base when said cassette is inserted into said sleeve and then returning to its undistorted position when said cassette is positioned between said top wall and said support surface in a position wherein said protuberance means is aligned over one of said capstan locating holes to locate at least a portion of said protuberance means in one of said capstan locating holes.

2. The container of claim 1 including:

two protuberance means positioned on said top wall at a distance from one another which is equal to the distance between the two capstan locating holes of said cassette.

3. The container of claim 2 wherein:

each of said protuberance means comprises a boss integrally formed with said top wall and extending from said top wall toward said support surface.

4. The container of claim 3 wherein:

said upstanding walls, said top wall and said bosses are integrally formed of a flexible plastic material forming a unitary structure capable of being sealed to said support surface.

5. The container of claim 4 wherein:

each of said bosses comprises a hemispherical protrusion on the surface of said top wall.

6. The container of claim 5 including:

a third upstanding wall essentially mutually perpendicular to said support base, said other two upstanding walls and said top wall, and said third upstanding wall are integrally formed with said other two upstanding walls and said top wall.

7. The container of claim 6 wherein:

said hemispherical protrusions are located on said top wall adjacent to said third upstanding wall such that they are capable of being located in said capstan locating holes when said cassette is positioned in said sleeve such that said side surface of said cassette wherein said opening is located adjacent to said third upstanding wall.

8. The container of claim 2 including:

four protuberance means arranged in two sets, each member of each set located with respect to the other member of that set at a distance equal to the distance between the two capstan locating holes of said cassette;

each of said sets of said protuberance means located on said top wall adjacent to where said top wall is integrally formed with one of said upstanding walls such that one of said sets of said protuberance means is capable of being located in said capstan locating holes when said cassette is positioned in said sleeve such that said side surface of said cassette wherein said opening is located adjacent to one of said upstanding walls.

9. The container of claim 8 including:

each of said protuberance means comprises a boss integrally formed with said top wall and extending from said top wall toward said support surface;

said upstanding walls, said top wall and said bosses are integrally formed of a flexible plastic material forming a unitary structure capable of being sealed to said support surface.

10. The container of claim 9 including:

a plurality of holding sleeves located on said support surface such that one of the upstanding walls of one of said holding sleeves is adjacent to one of the upstanding walls of another of said holding sleeves.

* * * * *